United States Patent
Pennala et al.

(10) Patent No.: US 9,964,168 B1
(45) Date of Patent: May 8, 2018

(54) BRAKE PAD WEAR AND TEMPERATURE SENSOR

(71) Applicant: GM GLOBAL TECHNOLOGY OPERATIONS LLC, Detroit, MI (US)

(72) Inventors: John W. Pennala, Howell, MI (US); Robert L. Nisonger, Milford, MI (US); Phanu Amatyakul, Brighton, MI (US); Eric E. Krueger, Chelsea, MI (US); Steven J. Weber, Mount Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/346,756

(22) Filed: Nov. 9, 2016

(51) Int. Cl.
*F16D 66/02* (2006.01)

(52) U.S. Cl.
CPC ......... *F16D 66/027* (2013.01); *F16D 66/024* (2013.01)

(58) Field of Classification Search
CPC .. F16D 2066/001; F16D 66/02–66/027; B60T 17/22
USPC ..................................... 188/1.11 L
See application file for complete search history.

(56) References Cited

U.S. PATENT DOCUMENTS

| | | | | |
|---|---|---|---|---|
| 4,520,661 A | * | 6/1985 | Tamai | F16D 66/00 188/1.11 L |
| 5,651,431 A | * | 7/1997 | Kyrtsos | F16D 66/026 188/1.11 L |
| 5,939,978 A | * | 8/1999 | Kyrtsos | F16D 66/00 116/208 |
| 6,250,430 B1 | * | 6/2001 | Kyrtsos | F16D 66/00 188/1.11 L |
| 2010/0017087 A1 | * | 1/2010 | Degenstein | B60T 8/268 701/70 |

* cited by examiner

*Primary Examiner* — Vishal R Sahni
(74) *Attorney, Agent, or Firm* — Quinn IP Law

(57) ABSTRACT

A brake pad monitoring sensor includes an erodible, electrically non-conductive body, and an electrical circuit disposed within the body. The electrical circuit includes a first wear indicating portion. Electrical continuity of the first wear indicating portion is broken when the body erodes, in response to abrasion against a brake rotor, beyond a first depth relative to a contact surface of the body, to sense a first degree of wear. The electrical circuit includes a first thermocouple that is operable to generate a temperature dependent voltage signal for sensing a temperature of the brake pad. The brake pad monitoring sensor may be used to determine both brake pad wear, and brake pad temperature.

14 Claims, 2 Drawing Sheets

BRAKE PAD WEAR AND TEMPERATURE SENSOR

TECHNICAL FIELD

The disclosure generally relates to a brake pad monitoring sensor for a vehicle.

BACKGROUND

Vehicles, such as cars, trucks, motorcycles, etc., often include disc brakes for slowing the rotation of a wheel or another driven component. A disc brake may include a brake pad, a brake caliper, and a brake disc, which is also known as a rotor. The brake disc is operatively connected to the wheel, and the brake caliper is operatively coupled to the brake pad. During operation, the brake caliper may press the brake pad against the brake disc. As a consequence, the friction between the brake pad and the brake disc causes the brake disc (and the wheel attached to the brake disc) to slow or stop.

Many vehicle systems use a brake temperature, i.e., a temperature of the brake pad, as an input. For example, the brake temperature may be used as an input for a traction control system, grade braking, or other systems. Additionally, the brake temperature may be used to estimate or predict the life of the brake pad.

SUMMARY

A brake pad monitoring sensor is provided. The brake pad monitoring sensor includes an erodible, electrically nonconductive body, and an electrical circuit disposed within the body. The electrical circuit includes a first wear indicating portion. Electrical continuity of the first wear indicating portion is broken when the body erodes beyond a first depth relative to a contact surface of the body, to sense a first degree of wear. The electrical circuit includes a first thermocouple that is operable to generate a temperature dependent voltage signal for sensing a temperature.

A vehicle is also provided. The vehicle includes a rotor, and a brake pad moveably coupled to the rotor. A brake pad monitoring sensor is positioned to wear concurrently with and to the same degree as the brake pad. The brake pad monitoring sensor includes an erodible, electrically nonconductive body having a contact surface for wearing against the rotor. An electrical circuit is disposed within the body, and is electrically connected to an electronic brake control module. The electrical circuit includes a first wear indicating portion providing electrical continuity. The electrical continuity of the first wear indicating portion is broken when the body erodes beyond a first depth relative to the contact surface. The electrical circuit includes a first thermocouple, which is operable to generate a temperature dependent voltage signal. The electronic brake control module is operable to determine electrical continuity in the first wear indicating portion to sense a first degree of wear of the brake pad when electrical continuity in the first wear indicating portion is broken. The electronic brake control module is also operable to sense the temperature dependent voltage signal from the first thermocouple to determine a temperature of the brake pad.

Accordingly, the brake pad monitoring sensor may be used to determine both the extent of wear in the brake pad, as well as a directly measure a temperature of the brake pad. Accordingly, the temperature of the brake pad may be measured directly, instead of estimating a temperature from a model, based on various operating factors and/or inputs.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Figure 1:
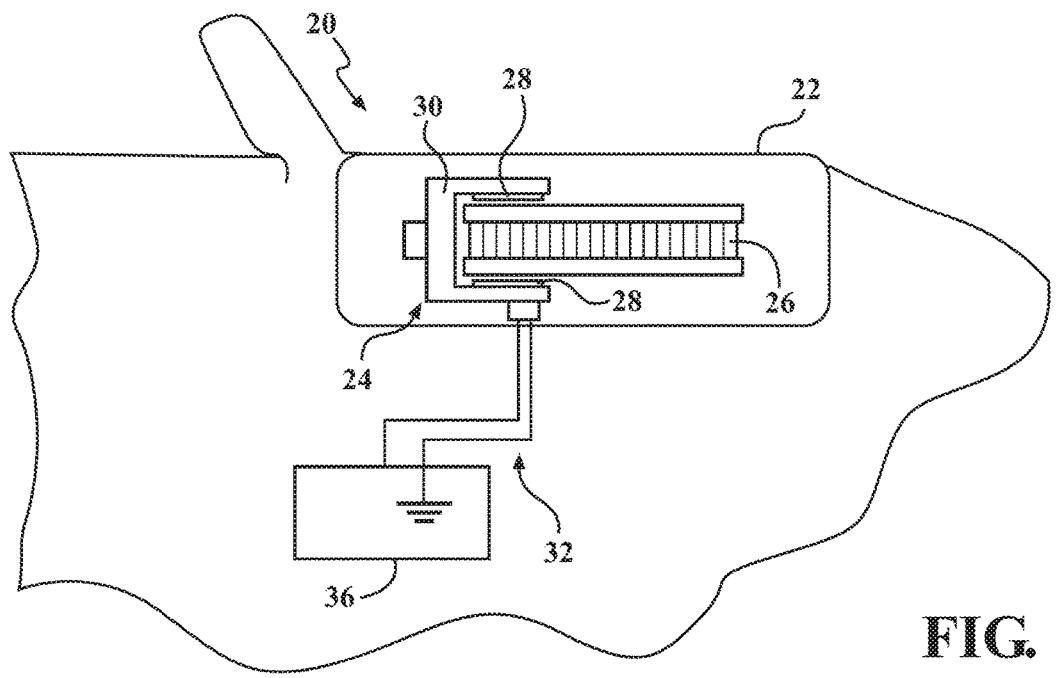
FIG. 1 is a schematic fragmentary plan view of a vehicle.

Referring to the Figures, wherein like numerals indicate like parts throughout the several views, a vehicle is generally shown at 20. Referring to FIG. 1, the vehicle 20 may include, but is not limited to, a car, truck, motorcycle, or any other moveable platform. The vehicle 20 includes at least one wheel 22, and a brake system 24 operatively coupled to the wheel 22. The brake system 24 may slow or stop the rotation of the wheel 22 when a driver actuates a brake pedal (not shown). The brake system 24 may include a rotor 26 (or brake disc), one or more brake pads 28, and a brake caliper 30 (or any other suitable actuator) capable of pressing the brake pads 28 against the rotor 26. In the depicted embodiment, the brake system 24 includes a set of two brake pads 28. Each brake pad 28 is therefore operatively coupled to the rotor 26. The brake caliper 30 is operatively coupled to the brake pedal (not shown). Accordingly, depressing the brake pedal (not shown) actuates the brake caliper 30. Upon actuation, the brake caliper 30 moves the brake pads 28 toward the rotor 26. The brake pads 28 are therefore movably coupled to the rotor 26. When the brake caliper 30 is actuated, the brake pads 28 contact the rotor 26. The friction between the brake pads 28 and the rotor 26 causes the rotor 26 (and the wheel 22 operatively coupled to the rotor 26) to slow down or stop. This friction gradually wears the brake pads 28. Additionally, this friction heats the brake pads 28 and rotor 26. It is useful to monitor the wear and temperature of the brake pads 28 to estimate a life expectancy of the brake pads 28. Additionally, the temperature of the brake pads 28 may be used as an input for some other vehicle 20 system.

Referring to FIG. 1, a brake pad monitoring system 32 monitors the wear and temperature of the brake pads 28. To do so, the brake pad monitoring system 32 includes at least one brake pad monitoring sensor, generally indicated by reference numeral 34 in FIG. 1. The brake pad monitoring sensor 34 is operatively coupled to at least one brake pad 28.

Figure 2:
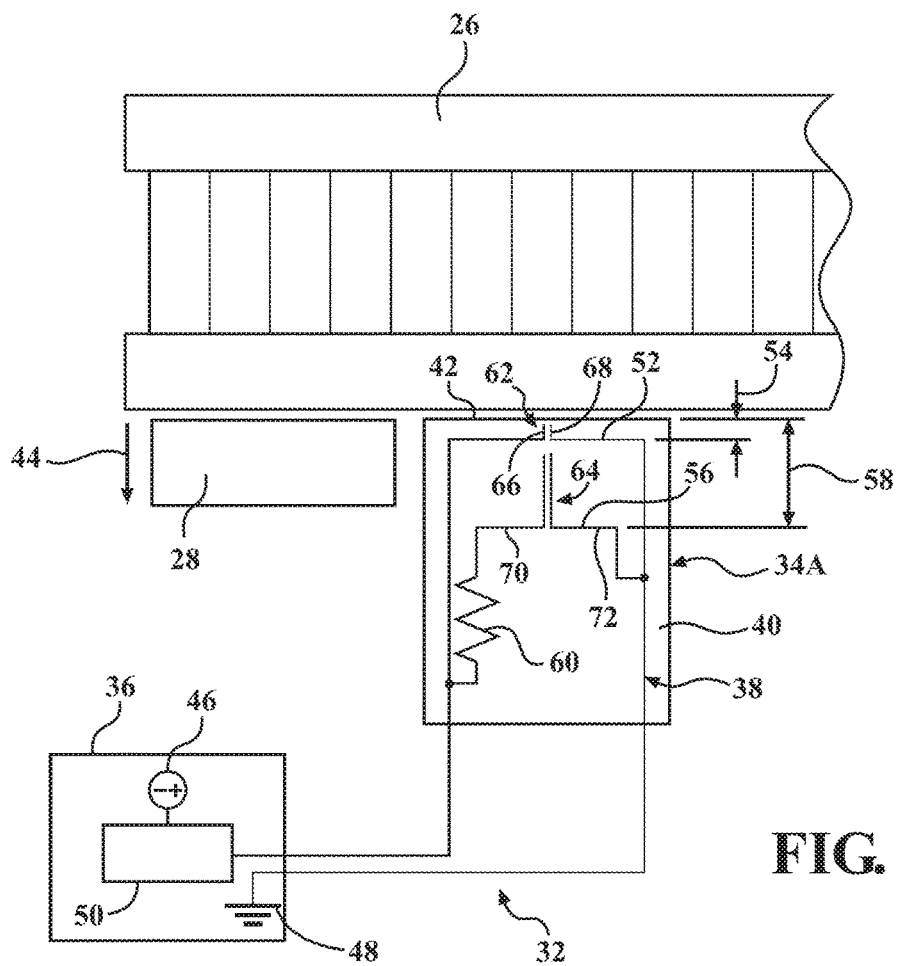
FIG. 2 is a schematic cross sectional view of a brake system of the vehicle, showing a first embodiment of a brake pad monitoring sensor.
Figure 3:
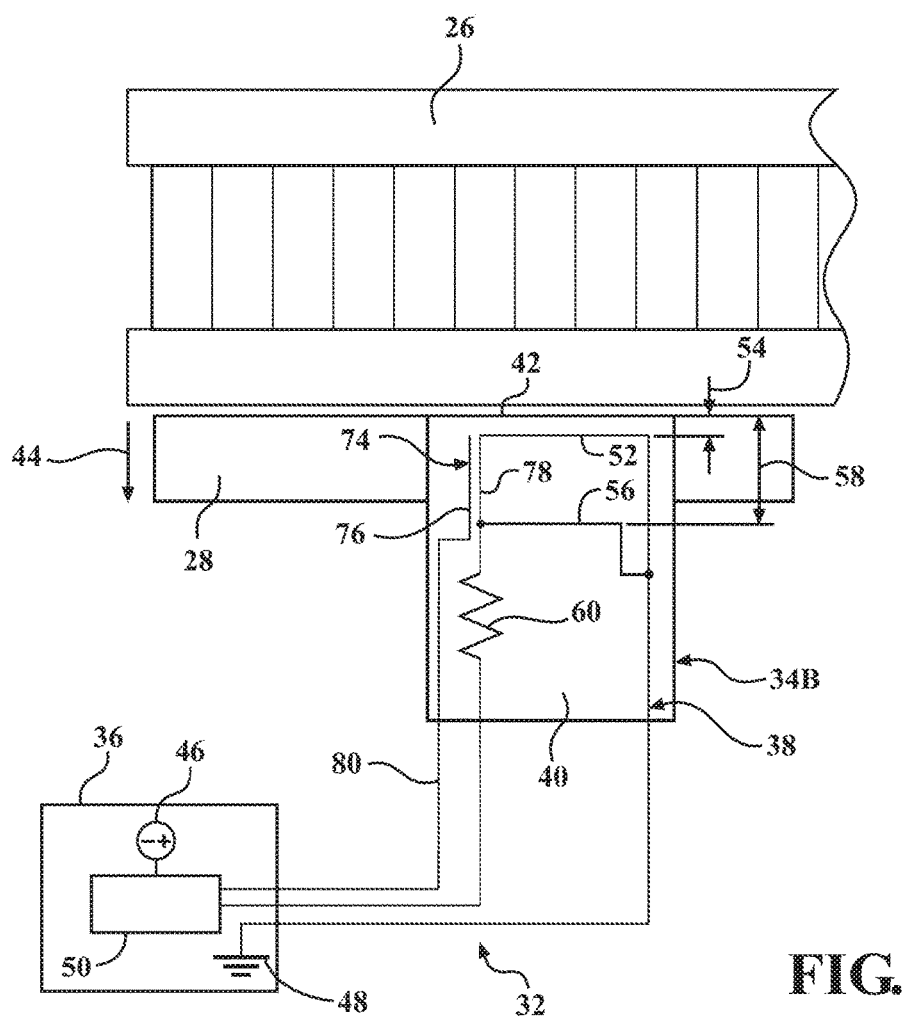
FIG. 3 is a schematic cross sectional view of the brake system of the vehicle, showing a second embodiment of the brake pad monitoring sensor.

A first embodiment of the brake pad monitoring sensor is generally shown in FIG. 2, and identified by the reference numeral 34A. A second embodiment of the brake pad monitoring sensor is generally shown in FIG. 3, and identified by the reference numeral 34B. An electronic brake control module 36 (EBCM 36) is electrically connected to and disposed in electrical communication with the brake pad monitoring sensor 34. The terms "control module," "module," "control," "controller," "control unit," "processor" and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. "Software," "firmware," "programs," "instructions," "routines," "code," "algorithms" and similar terms mean any controller executable instruction sets. The EBCM 36 includes at least one input/output interface for outputting and receiving signals from the brake pad monitoring sensor 34. For example, the EBCM 36 may serve as a voltage source and therefore provide voltage to the brake pad monitoring sensor 34. Further, the EBCM 36 may receive signals from the brake pad monitoring sensor 34 that are indicative of the wear and/or the temperature of the brake pads 28.

Referring to FIGS. 2 and 3, the brake pad monitoring sensor 34A, 34B includes an electrical circuit 38, which is at least partially disposed within an erodible, electrically non-conductive body 40. As used herein, the term "erodible" or "erode" is defined as the wearing down or away, or becoming worn down or away. The electrical circuit 38 is connected to the EBCM 36. The erodible, electrically non-conductive body 40 is wholly or partly made of an erodible material such as an erodible polymer and may be part of an erodible case. Moreover, the erodible, electrically non-conductive body 40 supports at least part of the electrical circuit 38 and is operatively coupled to the brake pad 28 such that the wear of the erodible, electrically non-conductive body 40 substantially matches (or at least corresponds) to the wear suffered by the brake pad 28.

The brake pad monitoring sensor 34A, 34B is positioned to wear concurrently with and to the same degree as the brake pad 28. As a non-limiting example, the erodible, electrically non-conductive body 40 may be substantially aligned with the brake pad 28 such that the wear of the brake pad 28 is identical (or at least substantially matches) the wear suffered by the brake pad 28. The erodible, electrically non-conductive body 40 may be operatively connected to the brake pad 28 such that the erodible, electrically non-conductive body 40 moves simultaneously with the brake pad 28. Alternatively, the brake pad monitoring sensor 34A, 34B may positioned within and supported by the brake pad 28.

The erodible, electrically non-conductive body 40 includes a contact surface 42 disposed adjacent the rotor 26, for wearing against the rotor 26. The friction between the rotor 26 and the brake pad 28 wears the brake pad 28 in the direction indicated by arrow 44. Similarly, the friction between the rotor 26 and the erodible, electrically non-conductive body 40 wears the wear sensor in the direction indicated by arrow 44.

The electrical circuit 38 has a circuit path from a power supply 46 to a ground 48. Preferably, the ground 48 is located within the EBCM 36. The EBCM 36 includes the power supply 46. The power supply 46 may be a regulated power supply 46, such as a regulated 5-volt voltage source.

The brake bad monitoring system further includes a measuring device 50 (e.g., ohmmeter, ammeter, voltmeter) to determine (e.g., measure) at least one electrical characteristic of the electrical circuit 38, such as resistance and/or voltage. In the depicted embodiment, the measuring device 50 is disposed within the EBCM 36 and can determine the resistance value of the electrical circuit 38, and determine the voltage through the electrical circuit 38. It is nonetheless contemplated that the measuring device 50 may be outside the EBCM 36. Regardless of its location, the measuring device 50 is electrically connected to the electrical circuit 38 such that the measuring device 50 is capable of determining a circuit resistance value in the circuit path of the electrical circuit 38, and a voltage value in the circuit path of the electrical circuit 38.

The electrical circuit 38 of the brake pad monitoring sensor 34A, 34B includes a first wear indicating portion 52, which provides electrical continuity for the electrical circuit 38. The electrical continuity of the first wear indicating portion 52 is broken when the body 40 erodes or wears beyond a first depth 54 relative to the contact surface 42 of the body 40. Accordingly, prior to the body 40 of the brake pad monitoring sensor 34A, 34B wearing to the first depth 54, the first wear indicating portion 52 provides electrical continuity at a first resistance value. After the brake pad monitoring sensor 34A, 34B is worn to or beyond the first depth 54, and the electrical continuity of the first wear indicating portion 52 is broken, the first wear indicating portion 52 does not provide electrical continuity for the electrical circuit 38 of the brake pad monitoring sensor 34A, 34B.

The EBCM 36 is operable to determine electrical continuity in the first wear indicating portion 52 to sense a first degree of wear of the brake pad 28 when electrical continuity in the first wear indicating portion 52 is broken. As such, when the EBCM 36 determines that the continuity of the first wear indicating portion 52 is broken, the EBCM 36 may determine that the body 40 of the brake pad monitoring sensor 34A, 34B, as well as the brake pad 28, have worn to at least the first depth 54 relative to the contact surface 42.

The electrical circuit 38 may further include a second wear indicating portion 56, which provides electrical continuity for the electrical circuit 38. As shown in FIGS. 2 and 3, the first wear indicating portion and the second wear indicating portion are connected in a parallel circuit having a first path and a second path. The first wear indicating portion is disposed in the first path of the parallel circuit, and the second wear indicating portion is disposed in the second path of the parallel circuit. The electrical continuity of the second wear indicating portion 56 is broken when the body 40 erodes or wears beyond a second depth 58 relative to the contact surface 42 of the body 40. The second depth 58 is farther from the contact surface 42 than the first depth 54. After the body 40 has been worn past the first depth 54 and electrical continuity of the first wear indicating portion 52 has been broken, and prior to the body 40 of the brake pad monitoring sensor 34A, 34B wearing to the second depth 58, the second wear indicating portion 56 provides electrical continuity at a second resistance value. The second resistance value is different than the first resistance value. As such, the EBCM 36 may determine if continuity is being made through the first wear indicating portion 52 or the second wear indicating portion 56 based on the measured resistance being equal to the first resistance value or the second resistance value. After the brake pad monitoring sensor 34A, 34B is worn to or beyond the second depth 58, and the electrical continuity of the second wear indicating portion 56 is broken, the second wear indicating portion 56 does not provide electrical continuity for the electrical circuit 38 of the brake pad monitoring sensor 34A, 34B.

It should be appreciated that the electrical circuit 38 may further include additional wear indicating portions (not shown), which provide electrical continuity for the electrical circuit 38. For example, the electrical circuit 38 may include a third wear indicating portion, a fourth wear indicating portion, a fifth wear indicating portion, etc. The electrical continuity of each of the additional wear indicating portions is broken when the body 40 erodes or wears beyond a respective depth relative to the contact surface 42 of the body 40. For example, the electrical continuity of a third wear indicating portion may be broken when the body 40 wears beyond a third depth, the electrical continuity of a fourth wear indicating portion may be broken when the body 40 wears beyond a fourth depth, etc.

The EBCM 36 is operable to determine electrical continuity in the second wear indicating portion 56 to sense a second degree of wear of the brake pad 28 when electrical continuity in the second wear indicating portion 56 is broken. As such, when the EBCM 36 determines that the continuity of the second wear indicating portion 56 is broken, the EBCM 36 may determine that the body 40 of the brake pad monitoring sensor 34A, 34B, as well as the brake pad 28, have worn to at least the second depth 58 relative to the contact surface 42.

The electrical circuit 38 of the brake pad monitoring sensor 34A, 34B may include at least one resistor 60 that is electrically connected to one of the first wear indicating portion 52 and the second wear indicating portion 56 of the electrical circuit 38. The resistor 60 is positioned so that a measured resistance value through the first wear indicating portion 52 is different than a measured resistance value through the second wear indicating portion 56, thereby allowing the EBCM 36 to determine which one of the first wear indicating portion 52 and the second wear indicating portion 56 are providing continuity for the electrical circuit 38.

Referring to FIG. 2, the electrical circuit 38 of the first embodiment of the brake pad monitoring sensor 34A, includes a first thermocouple 62 and a second thermocouple 64. The first thermocouple 62 is operable to generate a temperature dependent voltage signal for sensing a temperature of the brake pad 28. The first thermocouple 62 is integral with and mostly forms the first wear indicating portion 52 of the electrical circuit 38. The first thermocouple 62 may include any thermocouple suitable for use in a brake system 24. The first thermocouple 62 includes a first conductor 66 from a first material and a second conductor 68 from a second material. The first material of the first conductor 66 is different from the second material of the second conductor 68. The dissimilar materials generate a temperature dependent voltage signal, which may be interpreted by the EBCM 36 to directly measure the temperature of the body 40 of the brake pad monitoring sensor 34A. When the brake pad monitoring sensor 34A is positioned closely to or within the brake pad 28, the sensed temperature from the first thermocouple 62 is approximately equal to the temperature of the brake pad 28 itself. The first thermocouple 62 may include, but is not limited to, a type J thermocouple or a type K thermocouple. The first conductor 66 and the second conductor 68 of the first thermocouple 62 extend generally perpendicular with the contact surface 42.

The second thermocouple 64 is also operable to generate a temperature dependent voltage signal for sensing a temperature of the brake pad 28. The second thermocouple 64 is integral with and mostly forms the second wear indicating portion 56 of the electrical circuit 38. The second thermocouple 64 may include any thermocouple suitable for use in a brake system 24. The second thermocouple 64 includes a first conductor 70 from a first material and a second conductor 72 from a second material. The first material of the first conductor 70 is different from the second material of the second conductor 72. The dissimilar materials generate a temperature dependent voltage signal, which may be interpreted by the EBCM 36 to directly measure the temperature of the body 40 of the brake pad monitoring sensor 34A. When the brake pad monitoring sensor 34A is positioned closely to or within the brake pad 28, the sensed temperature from the second thermocouple 64 is approximately equal to the temperature of the brake pad 28 itself. The second thermocouple 64 may include, but is not limited to, a type J thermocouple or a type K thermocouple. The first conductor 70 and the second conductor 72 of the second thermocouple 64 extend generally perpendicular with the contact surface 42. Additionally, the first thermocouple 62 and the second thermocouple 64 are generally parallel with each other, and aligned perpendicularly relative to the contact surface 42 of the body 40, with the regions bounded by the first depth 54 and the second depth 58 respectively.

Referring to FIG. 3, the electrical circuit 38 of the second embodiment of the brake pad monitoring sensor 34B includes only a single thermocouple, referred to hereafter as the first thermocouple 74. The first thermocouple 74 is operable to generate a temperature dependent voltage signal for sensing a temperature of the brake pad 28. The first thermocouple 74 may include any thermocouple suitable for use in a brake system 24. The first thermocouple 74 includes a first conductor 76 from a first material and a second conductor 78 from a second material. The first material of the first conductor 76 is different from the second material of the second conductor 78. The dissimilar materials generate a temperature dependent voltage signal, which may be interpreted by the EBCM 36 to directly measure the temperature of the body 40 of the brake pad monitoring sensor 34B. When the brake pad monitoring sensor 34B is positioned closely to or within the brake pad 28, the sensed temperature from the first thermocouple 74 is approximately equal to the temperature of the brake pad 28 itself. The first thermocouple 74 may include, but is not limited to, a type J thermocouple or a type K thermocouple.

The first conductor 76 and the second conductor 78 of the first thermocouple 74 extend generally perpendicular to the contact surface 42. The first thermocouple 74 electrically connects the first wear indicating portion 52 and the second wear indicating portion 56 of the electrical circuit 38 of the second embodiment of the brake pad monitoring sensor 34B. As shown in the exemplary embodiment of FIG. 3, the second conductor 78 is directly connected to the resistor 60, the first wear indicating portion 52, and the second wear indicating portion 56. The first conductor 76 of the first thermocouple 74 is connected to the EBCM 36 via a connector 80. Accordingly, the one thermocouple, i.e., the first thermocouple 74 of the second embodiment of the brake pad monitoring sensor 34B, is operable to provide the temperature dependent voltage signal to the EBCM 36, regardless of which of the first wear indicating portion 52 or the second wear indicating portion 56 of the electrical circuit 38 is providing continuity for the electrical circuit 38.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A brake pad monitoring sensor comprising:
an erodible, electrically non-conductive body;
an electrical circuit disposed within the body, and including a first wear indicating portion, wherein electrical continuity of the first wear indicating portion is broken when the body erodes beyond a first depth relative to a contact surface to sense a first degree of wear;
wherein the electrical circuit includes a second wear indicating portion, wherein electrical continuity of the second wear indicating portion is broken when the body erodes beyond a second depth relative to the contact surface to sense a second degree of wear, with the second depth being farther from the contact surface than the first depth;
wherein the first wear indicating portion and the second wear indicating portion are connected in a parallel circuit, in which the first wear indicating portion is disposed in a first path of the parallel circuit and the second wear indicating portion is disposed in a second path of the parallel circuit; and
wherein the electrical circuit includes a first thermocouple operable to generate a temperature dependent voltage signal for sensing a temperature.

2. The brake pad monitoring sensor set forth in claim 1, wherein the first thermocouple is one of a type J thermocouple or a type K thermocouple.

3. The brake pad monitoring sensor set forth in claim 1, wherein the first thermocouple includes a first conductor from a first material and a second conductor from a second material, with the first material different from the second material.

4. The brake pad monitoring sensor set forth in claim 1, wherein the first thermocouple is integral with the first wear indicating portion of the electrical circuit.

5. The brake pad monitoring sensor set forth in claim 4, wherein a first conductor and a second conductor of the first thermocouple extend generally perpendicular to the contact surface.

6. The brake pad monitoring sensor set forth in claim 1, wherein the electrical circuit includes a second thermocouple integral with the second wear indicating portion and operable to generate a temperature dependent voltage signal for sensing a temperature.

7. The brake pad monitoring sensor set forth in claim 6, wherein a first conductor and a second conductor of the second thermocouple extend generally perpendicular to the contact surface.

8. The brake pad monitoring sensor set forth in claim 1, wherein the electrical circuit includes at least one resistor electrically connected to one of the first wear indicating portion and the second wear indicating portion of the electrical circuit.

9. A vehicle comprising:
a rotor;
a brake pad moveably coupled to the rotor;
an electronic brake control module;
a brake pad monitoring sensor positioned to wear concurrently with and to the same degree as the brake pad, the brake pad monitoring sensor including:
an erodible, electrically non-conductive body having a contact surface for wearing against the rotor;
an electrical circuit disposed within the body and electrically connected to the electronic brake control module, the electrical circuit including a first wear indicating portion providing electrical continuity, wherein the electrical continuity of the first wear indicating portion is broken when the body erodes beyond a first depth relative to the contact surface;
wherein the electrical circuit includes a second wear indicating portion providing electrical continuity, wherein the electrical continuity of the second wear indicating portion is broken when the body erodes beyond a second depth relative to the contact surface, with the second depth being farther from the contact surface than the first depth;
wherein the first wear indicating portion and the second wear indicating portion are connected in a parallel circuit, in which the first wear indicating portion is disposed in a first path of the parallel circuit and the second wear indicating portion is disposed in a second path of the parallel circuit;
wherein the electrical circuit includes a first thermocouple operable to generate a temperature dependent voltage signal; and
wherein the electronic brake control module is operable to determine electrical continuity in the first wear indicating portion to sense a first degree of wear of the brake pad when electrical continuity in the first wear indicating portion is broken, and the temperature dependent voltage signal from the first thermocouple to sense a temperature of the brake pad.

10. The vehicle set forth in claim 9, wherein the first thermocouple is integral with the first wear indicating portion of the electrical circuit, and wherein a first conductor and a second conductor of the first thermocouple extend generally perpendicular to the contact surface.

11. The vehicle set forth in claim 9, wherein the electrical circuit includes a second thermocouple integral with the second wear indicating portion and operable to generate a temperature dependent voltage signal for sensing a temperature.

12. The vehicle set forth in claim 11, wherein a first conductor and a second conductor of the second thermocouple extend generally perpendicular to the contact surface.

13. The vehicle set forth in claim 9, wherein the brake pad monitoring sensor is positioned within and supported by the brake pad.

14. The vehicle set forth in claim 9, wherein the electrical circuit includes at least one resistor electrically connected to one of the first wear indicating portion and the second wear indicating portion of the electrical circuit.

* * * * *